May 18, 1965 G. E. MINTZ 3,184,262
CAB MOUNTING DEVICE
Filed Nov. 6, 1962 2 Sheets-Sheet 1

INVENTOR.
GERALD E. MINTZ
BY
his ATTORNEYS

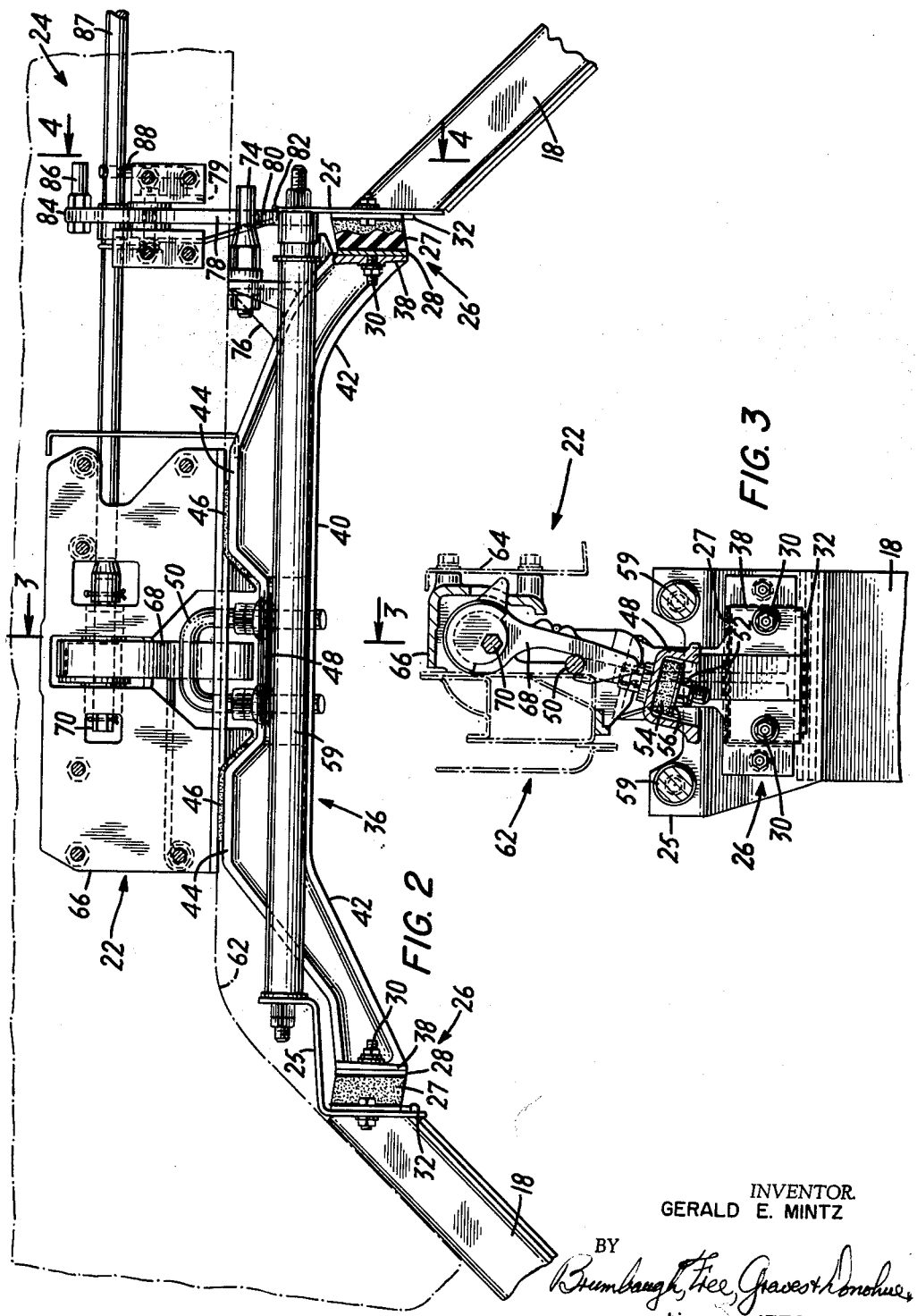

3,184,262
CAB MOUNTING DEVICE
Gerald E. Mintz, Emmaus, Pa., assignor to Mack Trucks, Inc., Plainfield, N.J., a corporation of New York
Filed Nov. 6, 1962, Ser. No. 235,661
8 Claims. (Cl. 296—35)

This invention relates to tilting cab vehicles and, more particularly, to an improved mounting device to support the non-pivoted portion of the cab.

In titlting cab vehicles, the cab is generally mounted for pivoting movement about its lower front end so that it can be swung forward to uncover the engine for servicing, while the rear of the cab is held down in position for driving by a releasable latch. The riding characteristics of such vehicles have been generally found to be extremely unsatisfactory, since the pitching backward and forward of the cab results in a "back-slapping" to the driver that is at best most uncomfortable and at times so severe that safe operation of the vehicle is impaired. Improvements in the chassis suspension have, to a limited extent, improved the riding qualities of the vehicle cab. However, very little has been done to the cab mounting arrangements to further isolate the cab from the contortions and jolts the chassis receives in service.

The present invention is directed toward improving the riding characteristics by providing a novel cab mounting device to absorb most or all of the fore and aft pitching. In accordance with the invention, resilient blocks are attached to spaced-apart frame members of the vehicle. Connected to the resilient blocks and spanning the space between the frame members is a member for supporting the end of a pivotally mounted cab opposite the pivot mounting arrangement and having means thereon for releasably securing the cab thereto.

More particularly, upstanding frame members, the upper portions of which converge, are attached to the side channels of the chassis frame. Spanning the space between the frame members is a yoke which is suspended on resilient mounting blocks attached to the frame members. When the cab is in the down position for driving, a latch on the cab actuated by a lever system engages a U-bolt attached at the center of the yoke, and a safety catch hooks under a pin provided at one side of the yoke. Between the nuts on the U-bolt and the underside of the yoke is a resilient gasket which applies downward force on the latch to hold it in place. This gasket also is sufficiently resilient to provide further shock isolation to the cab as well as to permit release of the latch when the lever is acutated. The frame members are made more rigid by connecting spacer bars between them.

In operation, an upward movement of the rear of the truck chassis, such as might be caused by a forward pitch of the truck chassis results in a compensating distending of the resilient mounting blocks which are flexed downwardly by the resisting inertial forces of the cab. The opposite effect is produced by a backward pitch of the chassis. In this way, the pitching motion of the cab is eliminated or substantially reduced.

For a better understanding of the invention, reference may be made to the following detailed description taken in conjunction with the figures of the appended drawings, in which:

FIGURE 2 is a rear elevational view of the cab mounting device of FIGURE 1, in an expanded scale and with portions illustrated in section for clarity;

FIGURE 3 is a view in section taken along the line 3—3 of FIGURE 2 looking in the direction of the arrows and showing the details of a primary latch mechanism for securing the cab to the mounting device.

Figure 1:
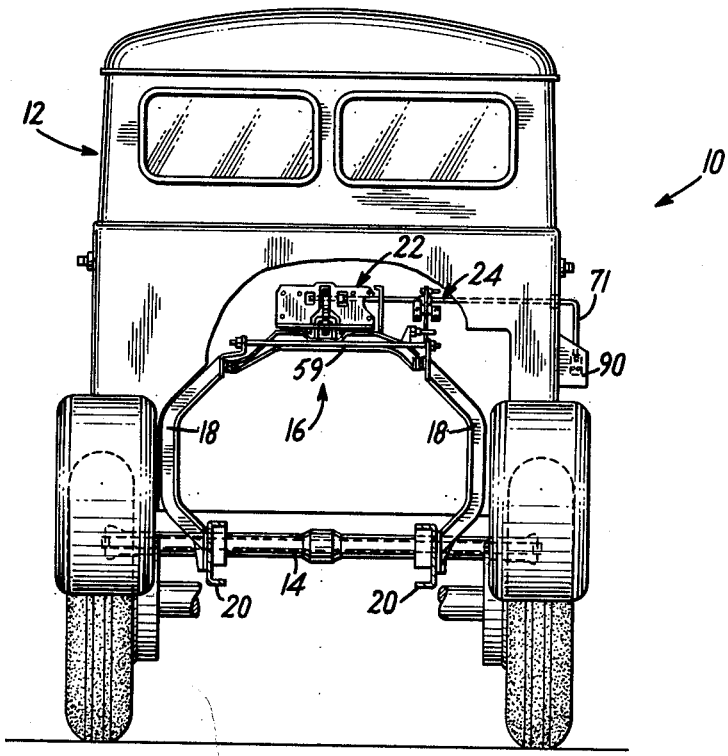
FIGURE 1 is a rear elevational view of a truck from which the rear frame, axle, transmission system and engine are omitted, and a portion of a rear panel on the cab is cut away, with the cab mounted on an exemplary form of mounting device, in accordance with the invention.

Illustrated in FIGURE 1 is a truck 10 having a cab 12 arranged to rotate or tilt about its lower front end, such as about a shaft or torsion bar 14 on the truck chassis. The rear of the cab is supported by a mounting device 16 installed between upstanding, converging frame members 18 attached to side channels 20 of the truck chassis. A primary latch mechanism 22 holds the cab down in driving position and may be released to tilt the cab forward to service the engine, transmission and other parts installed under the cab. A safety latch 24 is also provided.

As best shown in FIGURE 2, brackets 25 are welded or otherwise attached to the upstanding frame members 18. Fastened to the brackets are resilient mounting blocks 26 each of which, for example, may comprise a resilient rubber block 27 to which a front plate 28 having studs 30 projecting therefrom and a rear plate 32 are bonded. As shown in FIGURE 3, the ends of the rear plate 32 extend beyond the sides of the resilient blocks 27 and are bolted to the bracket 25.

Spanning the space between the resilient mounting blocks 26 is a yoke 36, the ends of which have plates 38 having holes to receive the studs 30. The yoke has a generally horizontal middle portion 40 and arms 42 extending laterally and downwardly from the middle portion. On the top of middle portion 40 are raised bearing surfaces 44 which may be provided with shock and vibration isolating means such as rubber bearing pads 46. Between and below the bearing surfaces 44 is a channel-shaped section 48 on which latch receiving means, for example, a U-bolt 50, is installed. As best shown in FIGURE 3, the U-bolt 50 is attached to the section 48 by means of nuts 52, rubber gaskets 54 and washers 56 being placed between the nuts 52 and the channel section 48.

To strengthen the frame members 18, by which the yoke 36 is supported, two spacer bars 59 are bolted to the brackets 25.

As best shown in FIGURES 2 and 3, the cab rests on the bearing portions 44 and is held in a down position by means of a primary latch mechanism 22 installed between the rear panel 66 and a frame member 64 of the cab. The latch mechanism 22 comprises a suitable bracket 66, a latch 68 pivotally mounted on the bracket and an eccentrically located shaft 70. The latch 68 is actuated by means of a lever 71, shown in FIGURE 1.

Figure 4:
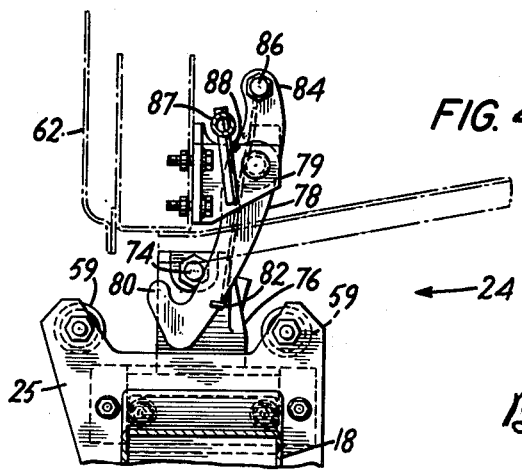
FIGURE 4 is a view in section taken along the line 4—4 of FIGURE 2, looking in the direction of the arrows and showing the details of a safety latch arrangement.

Referring to FIGURES 2 and 4, the mounting device is also provided with a safety latch 24 which is located at one side of the yoke 36. A laterally projecting pin 47 is bolted on an upstanding bracket 76 mounted on the top of the yoke 36. The pin is contacted by a latch hook 78 pivotally mounted on a bracket 79 fastened to the cab panel 62. The latch has a hooked end 80 which normally is located somewhat below the pin. If for any reason the primary latch mechanism 22 should fail, the cab would tilt forward and up slightly until the hooked end 80 of the latch 78 is firmly engaged on the pin 74, thereby preventing further tilting of the cab. A wire spring 82 attached to the latch bracket 79 wraps around the lower portion of the latch hook 78 to maintain it in position against the pin 74 at all times. The upper portion 84 of the latch 78 is provided with a projecting pin 86. An actuating bar 87, which is connected to the lever 71 and is pinned to the shaft 70 on the primary latch mechanism 22, passes behind and below the pin 86 and is provided with a downwardly directed rod 88.

The latch mechanisms operate in the following manner. The lever 71 at the side of the cab is released from a bracket 90 and pushed forward causing the actuating bar 87 to rotate counterclockwise and the primary latch 68 to be pulled forward against the U-bolt 50. The flexible gaskets 54 are compressed, thereby permitting the latch 68 to slide from under and disengage the U-bolt 50. The cab is then free to tilt forward until the latch hook 78 engages the pin 74 on the yoke 36. Upon further movement of the lever 71, the rod 88 contacts the pin 86 forcing the latch hook 78 out of engagement with the pin 74. The cab may then be tilted forward to permit entry to the engine for servicing or maintenance. When the cab is lowered into driving position, the spring 82 bearing on the latch hook 78 forces it into engagement with the rod 74 and the lever 71 may then be pulled back to lock the primary latch mechanism 22.

It is readily apparent that the cab resting on the yoke 36 results in shearing and bending forces on the resilient mounting blocks 26. An upward movement of the rear of the truck chassis and therefore the frame members 18, such as might be caused by forward pitching of the truck, results in a downward flexing and lateral distending of the rubber blocks 27 caused by the inertial forces acting on the cab resisting the upward movement. The opposite effect is produced by a downward movement of the rear of the truck chassis, such as might be caused by a backward pitching motion of the truck. Consequently, the riding qualities of the cab are significantly improved by the elimination of fore and aft pitching. In addition, the cab is insulated from any shock or vibration induced in the truck chassis by the resilient mounting blocks 27, the rubber pads 46 on the bearing surfaces of the yoke, and the rubber gaskets 52 on the U-bolt 50.

It will be understood by those skilled in the art that the above-described embodiment is merely exemplary and that it is susceptible of variation and modification as to sizes and shapes of its components and many other details of construction of the yoke, bracketing and frame arrangements, and latch mechanisms without departing from the spirit and scope of the invention. Therefore, the invention is not deemed to be limited except as defined in the appended claims.

I claim:

1. In a vehicle having a cab mounted pivotally with respect to the frame thereof, said frame including spaced-apart frame members, the combination therewith of cab mounting means, comprising a resilient mounting block attached to each of the spaced-apart frame members and extending generally laterally from the frame members, a yoke spanning the spaced-apart frame members and connected to the opposite ends of each of said mounting blocks, releasable latch means on said cab, and means on said yoke cooperative with and receiving said releasable latch means for releasably securing the cab to said yoke, whereby floating vertical movement of said yoke and the cab is afforded.

2. The combination claimed in claim 1, including means secured to and spanning said spaced-apart frame members for strengthening and for restraining said spaced-apart frame members from lateral movement.

3. In a vehicle having a tilting cab and a vehicle frame including frame members disposed at each side of the vehicle frame, the combination therewith of cab mounting means, comprising a resilient mounting block fastened to each of the frame members at one end of said mounting blocks and extending generally laterally from the frame members, a yoke having its ends connected to and disposed between said resilient mounting blocks and resiliently supported thereby, said yoke having bearing surfaces for selectively supporting the cab, primary latching means on the vehicle cab, safety latching means on the vehicle cab, respective means on said yoke for engaging said primary and said safety latching means, and spacer bars connected between said frame members.

4. The combination as claimed in claim 3, in which said means for engaging said primary latching means on the cab comprises a U-bolt having fastening means inserted through said yoke, and a resilient gasket placed between said yoke and said fastening means of said U-bolt.

5. In a vehicle having a cab mounted pivotally with respect to the frame thereof, said frame including spaced-apart frame members, the combination therewith of cab mounting means, comprising a resilient mounting block attached to each of the spaced-apart frame members at one end of said mounting blocks, a yoke spanning the spaced-apart frame members and having ends which are spaced-apart from the frame members and connected to the opposite ends of said mounting blocks, said one end and said opposite end of the mounting blocks spaced-apart horizontally to facilitate relative vertical movement of one end with respect to the other end thereof, thereby selectively supporting the pivotally mounted cab, and primary latch means for releasably securing the pivotally mounted cab to said yoke.

6. The combination claimed in claim 5, wherein said ends of said resilient mounting blocks lie in generally vertical planes with respect to the horizontal plane of the vehicle.

7. The combination claimed in claim 5, wherein resilient means are provided on said yoke between the cab and said yoke for insulating the cab from shock and vibration, and said primary latch means includes resilient means for absorbing shock and vibration of the vehicle and for retaining the cab in secured relation to said yoke.

8. The combination as claimed in claim 7, wherein said latch means comprises a U-bolt having fastening means inserted through said yoke, and wherein said resilient means is a gasket placed between said yoke and said fastening means of said U-bolt.

References Cited by the Examiner

UNITED STATES PATENTS

| | | | |
|---|---|---|---|
| 2,864,121 | 12/58 | Imber et al. | 180—89 X |
| 2,912,057 | 11/59 | Wagner | 180—89 X |
| 2,939,541 | 6/60 | Smalley | 180—89 |
| 2,943,693 | 7/60 | Norrie | 180—89 |
| 3,051,259 | 8/62 | Lorenz | 180—89 |

FOREIGN PATENTS

| | | |
|---|---|---|
| 636,586 | 2/62 | Canada. |

A. HARRY LEVY, *Primary Examiner.*